(12) United States Patent
Zalevsky et al.

(10) Patent No.: US 7,777,932 B2
(45) Date of Patent: Aug. 17, 2010

(54) ALL OPTICAL SYSTEM AND METHOD FOR PROVIDING EXTENDED DEPTH OF FOCUS OF IMAGING

(75) Inventors: Zeev Zalevsky, Rosh HaAyin (IL); Shai Ben-Yaish, Petach Tiqva (IL)

(73) Assignee: Xceed Imaging Ltd., Rosh Haayin (IL)

( * ) Notice: Subject to any disclaimer, the term of this patent is extended or adjusted under 35 U.S.C. 154(b) by 0 days.

(21) Appl. No.: 12/254,138

(22) Filed: Oct. 20, 2008

(65) Prior Publication Data

US 2009/0116096 A1 May 7, 2009

Related U.S. Application Data

(63) Continuation of application No. PCT/IL2007/000499, filed on Apr. 22, 2007.

(60) Provisional application No. 60/793,227, filed on Apr. 20, 2006.

(51) Int. Cl.
*G02B 1/07* (2006.01)
(52) U.S. Cl. .................. 359/256; 359/245; 359/246
(58) Field of Classification Search ............... 359/256, 359/246, 245, 238, 676
See application file for complete search history.

(56) References Cited

U.S. PATENT DOCUMENTS

| 6,144,489 A | 11/2000 | Wilson et al. |
| 6,288,767 B1 | 9/2001 | Murata et al. |
| 7,061,693 B2 | 6/2006 | Zalevsky |
| 7,556,443 B2 * | 7/2009 | Kleverman ............... 396/529 |
| 2005/0099594 A1 * | 5/2005 | Blum et al. ............ 351/160 R |
| 2006/0034003 A1 | 2/2006 | Zalevsky |
| 2007/0153234 A1 * | 7/2007 | Salters et al. ................ 353/8 |

FOREIGN PATENT DOCUMENTS

EP 1 731 928 A2 * 6/2006

OTHER PUBLICATIONS

Ben-Eliezer, Eyal, et al., "All-optical extended depth of field imaging system," Journal of Optics A: Pure and Applied Optics, vol. 5, S1-S6, 2003.
Ben-Eliezer, Eyal, et al., "Experimental realization of an imaging system with an extended depth of field," Applied Optics, vol. 44, No. 14, 2792-2798, May 10, 2005.

(Continued)

*Primary Examiner*—Timothy J Thompson
(74) *Attorney, Agent, or Firm*—Houston Eliseeva LLP (57) ABSTRACT

An imaging system and method are presented. The system comprises an imaging lens unit, an imaging detector, and a birefringent element located between the imaging lens unit and the imaging detector. The system is thus configure and operable to provide in-focus imaging of objects located at both near-field and far-field ranges. Also provided is an optical device configured to be mounted on an imaging lens, being one of the following: a lens of an individual's glasses, on a contact lens, and an eye internal lens. The optical device is configured to be located between the imaging lens and the retina and comprises a birefringent element, to thereby provide in-focus imaging onto the retina of the objects located at both near-field and far-field ranges therefrom.

28 Claims, 7 Drawing Sheets

OTHER PUBLICATIONS

Bhattacharya, Kallol, et al., "Simulation of effects of phase and amplitude coatings on the lens aperture with polarization masks," J. Opt. Soc. Am. A, vol. 11, No. 2, 586-592, Feb. 1994.

Chi, Wanli, et al., "Electronic imaging using a logarithmic asphere," Optics Letters, vol. 26, No. 12, 875-877, Jun. 15, 2001.

Dowski, Edward R., Jr., et al., "Extended depth of field through wave-front coding," Applied Optics, vol. 34, No. 11, 1859-1866, Apr. 10, 1995.

Liu, Xinping, et al., "Cemented doublet lens with an extended focal depth," Optics Express, vol. 13, No. 2, 552-557, Jan. 24, 2005.

Ojeda-Castaneda, Jorge, et al., "Arbitrarily high focal depth with a quasioptimum real and positive transmittance apodizer," Applied Optics, vol. 28, No. 13, 2666-2670, Jul. 1, 1989.

Ojeda-Castaneda, Jorge, et al., "Supergaussian rings: focusing properties," Optics Communications, vol. 114, Issues 3-4, 189, Feb. 1, 1995, abstract only.

Ojeda-Castaneda, Jorge, et al., "Zone plate for arbitrarily high focal depth," Applied Optics, vol. 29, No. 7, 994-997, Mar. 1, 1990.

Sanyal, Sucharita, et al., "High focal depth with a quasi-bifocus birefringent lens," Applied Optics, vol. 39, No. 14, 2321-2325, May 10, 2000.

Sanyal, Sucharita, et al., "High tolerance to spherical aberrations and defects of focus with a birefringent lens," Applied Optics, vol. 41, No. 22, 4611-4619, Aug. 1, 2002.

Sanyal, Sucharita, et al., "Imaging characteristics of birefringent lenses under focused and defocused condition," Optik 110, No. 11, 513-520, 1999.

Sanyal, Sucharita, et al., "Vector wave imagery using a birefringent lens," Opt. Eng. 37(2), 592-599, Feb. 1998.

Van Der Gracht, Joseph, et al. "Broadband behavior of an optical-digital focus-invariant system," Optics Letters, vol. 21, No. 13, 919-921, Jul. 1, 1996.

Zalevsky, Zeev, et al., "All-optical axial super resolving imaging using a low-frequency binary-phase mask," Optics Express, vol. 14, No. 7, 2631-2643, Apr. 3, 2006.

International Search Report dated Sep. 22, 2008, from counterpart International Application No. PCT/IL07/000499, filed on Apr. 22, 2007.

International Preliminary report on Patentability dated Mar. 10, 2009, from counterpart International Application No. PCT/IL07/000499, filed on Apr. 22, 2007.

* cited by examiner

FIG.6

ALL OPTICAL SYSTEM AND METHOD FOR PROVIDING EXTENDED DEPTH OF FOCUS OF IMAGING

RELATED APPLICATIONS

This application is a Continuation of PCT application serial number PCT/IL2007/000499, filed on Apr. 22, 2007, which claims the benefit under 35 USC 119(e) of U.S. Provisional Application No. 60/793,227, filed on Apr. 20, 2006, both of which are incorporated herein by reference in their entirety.

FIELD OF THE INVENTION

This invention is generally in the field of imaging techniques, and relates to an all-optical system and method capable of providing extended depth of focus.

BACKGROUND OF THE INVENTION

Extending the depth of focus of imaging systems is a very important technology allowing the system incorporation into various applications, including inter alia medically related applications where elements, such as cameras, are to be inserted into the body in order to observe and detect problematic tissues; as well as ophthalmic industry including glasses for spectacles, contact lenses, intraocular lenses or other lenses inserted surgically into the eye. The extended depth of focus solution is also needed for optical devices like microscopes or cameras for industrial, medical, surveillance or consumer applications, where focusing of light is required and where the conventional focusing techniques is based on the use of a multitude of lenses with the need of relative displacement between the focusing arrangement and an imager and/or object plane, by mechanical movement, either manually or electronically driven.

Various approaches have been proposed to achieve extended depth of focus. Some of the proposed techniques are based on the use of an aperture coding which later on require digital decoding (post-processing); some other approaches are based on the use of aperture apodization, e.g. by placing complicated diffractive optical elements or by all-optical means where a phase mask is added to the entrance pupil of the imaging lens. The polarization of light can add additional degree of freedom that may be used for the compromise done in the optimization process of the imaging system. Recently, a new approach has been developed in which a birefringent lens is used that produces two focal lengths (for each principle polarization state). By proper design of the lens the two focal lengths can be chosen such that the focusing range is extended (S. Sanyal, "High focal depth with a quasi-bifocus birefringent lens", Appl. Opt., 39, 2321-2325 (2000)). However the fabrication of such a lens is complicated and expensive.

SUMMARY OF THE INVENTION

There is a need in the art for an imaging system, preferably, an all-optical simple system, as well as simple and inexpensive system, capable of high-quality imaging of both near-field and far-field ranges.

The present invention solves the above need by providing a novel imaging system allowing obtaining longitudinal super resolved imaging, i.e. extended depth of focus. The invented solution is very simple and involves only the addition of a birefringent element between an imaging lens unit and an imaging detector of a conventional imaging module.

The birefringent element can be properly designed such that one polarization state from the ordinary and extraordinary ones contains in-focus near field information (positioned at about 20 cm or less from the imaging lens unit) while the other polarization state contains in-focus far field details (positioned from about 50 cm to infinity from the imaging lens unit). Both images are superimposed one on top of the other and thus an all-optical spatially sharp imaging is obtained containing both fields in-focus.

The birefringent element is preferably in the form of a birefringent plate of a predetermined thickness. The thickness of the birefringent plate is selected such that there is a longitudinal overlapping of the in-focus regions (the near and the far) such that continuously in-focus imaging is synthesized.

There is thus provided according to one broad aspect of the invention, an imaging system comprising: an imaging lens unit, an imaging detector, and a birefringent element located between said imaging lens unit and said imaging detector, the system thereby providing in-focus imaging of objects located at both near-field and far-field ranges.

The system is configured for providing the in-focus imaging of objects located from a distance of a few centimeters up to infinity from the imaging lens, for example below 10 cm from the imaging lens unit.

As indicated above, the birefringent element is preferably configured as a plate of a predetermined thickness. The thickness $\Delta_B$ of said birefringent plate is given by $$\Delta_B = \frac{\Delta}{\left(1 - \frac{n_o}{n_e}\right)}$$

where $\Delta$ is a difference between the far-field and near-field optical paths in free space for light passing through said imaging lens unit and $n_o$ and $n_e$ are refractive indices of the birefringent plate material for respectively ordinary and extra-ordinary polarization light components.

The thickness of the birefringent plate may be between about 0.5 mm and about 2.5 mm. The imaging lens unit may have a focal length of about 5 mm and an F-number of about 2.8.

In some embodiments of the invention, the birefringent element is configured for correct for aberrations caused by light propagation through the imaging lens unit. To this end, the birefringent element has different birefringence in its central and peripheral regions, e.g. by making these regions from materials of different birefringence.

In some embodiments of the invention, the birefringent element has a non-uniform shape, e.g. having a space varying width, e.g. being configured as a check board with different width of the squares of the check board, thus providing for coding multiple focusing planes.

In some embodiments of the invention, the birefringent element has a curtain surface curvature (rather than being a flat plate), thus providing for improving the depth of focus and for reducing aberrations of focusing.

In some embodiments of the invention, the system also includes a phase-affecting optical element located at an entrance pupil of the imaging lens unit. Such an optical element is disclosed in U.S. Pat. No. 7,061,693 assigned to the assignee of the present application. The optical element may be located close to, or attached to, or incorporated in the imaging lens unit. This optical element is configured as a phase-affecting, preferably non-diffractive, optical element defining a spatially low frequency phase transition. The optical element and the imaging lens define a predetermined pattern formed by spaced-apart substantially optically transparent features of different optical properties. Position of the phase transition region(s) of the optical element within the imaging lens plane is determined by at least a dimension of the affective aperture of the lens.

In some embodiments of the invention, where a combination of the birefringent element and phase-affecting optical element is used, the birefringent element may be configured for correcting of chromatic aberrations of the imaging lens unit (to provide coinciding focal planes for different wavelengths of input light), while the phase-affecting optical element provides an effect of extended depth of focus.

The imaging system of the present invention may be configured for use in a photographic camera, e.g. a camera to be installed in a handheld electronic device such as a mobile phone or PDA.

The system of the present invention may also be configured to be used with an ophthalmic lens, including glasses, contact lenses, as well as in IOLs and other eye inserted internal devices. For example, the birefringent element may be positioned behind the cornea lens of the eye, i.e. between the retina and the cornea, serving as an intraocular element.

According to another broad aspect of the invention, there is provided an all-optical imaging system configured to provide extended depth of focus for imaging both near-field and far-field located objects in substantially coinciding imaging planes, the system comprising: an imaging lens unit, an imaging detector, and a birefringent element located between said imaging lens unit and said imaging detector.

According to yet another aspect of the invention, there is provided an optical device for use is an imaging system having an imaging lens and a light sensitive element, the optical device comprising a birefringent element configured to be located between said imaging lens unit and said light sensitive element, the optical device being configured for providing extended depth of focus of imaging to provide in-focus imaging of objects located at both near-field and far-field ranges.

According to yet further aspect of the invention, there is provided an optical device configured to be mounted on an imaging lens, being one of the following: a lens of an individual's glasses, on a contact lens, and an eye internal lens, the optical device being configured to be located between the imaging lens and the retina and comprising a birefringent element, the optical device being configured for providing in-focus imaging onto the retina objects located at both near-field and far-field ranges therefrom.

In some embodiments of the invention, such optical device also includes a phase-affecting element.

According to yet another aspect of the invention, there is provided an imaging method for providing extended depth of focus, the method comprising passing light being focused by an imaging lens and propagating towards an imaging detector (e.g. an individual's retina), through a birefringent element, thereby imaging objects, located at near-field and far-field ranges with respect to the imaging lens, on substantially coinciding imaging planes.

It should also be noted that the invented approach can be utilized in an auto-focusing system with no moving parts. This is implemented by using in the auto-focusing system a spatial light modulator (SLM) operated to provide time-modulated birefringence of the light modulating material.

Thus, according to yet further broad aspects of the invention, there is provided an auto-focusing system and method utilizing the light passage through a spatial light modulator while performing time modulation of birefringence of the light modulating material of the spatial light modulator.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIGS. 1B and 1C exemplify an imaging system of the present invention, where

FIGS. 2A to 2C illustrate simulation results for the technique of the present invention, where

FIGS. 4A-4C show numerical testing of the technique of the present invention applied on real images, where

DETAILED DESCRIPTION OF THE PREFERRED EMBODIMENTS

Figure 1A:
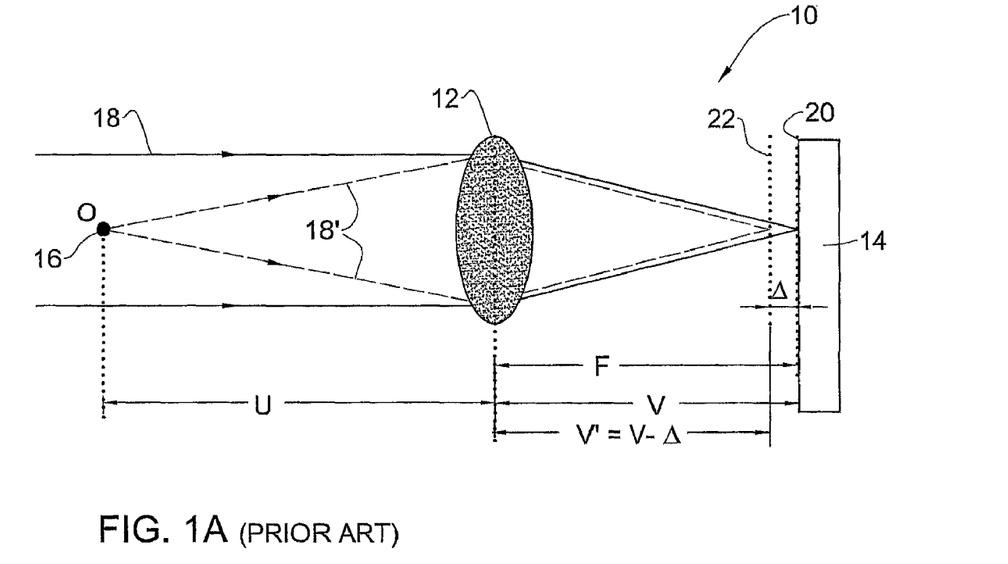
FIG. 1A shows schematically a conventional imaging system.
Figure 1B:
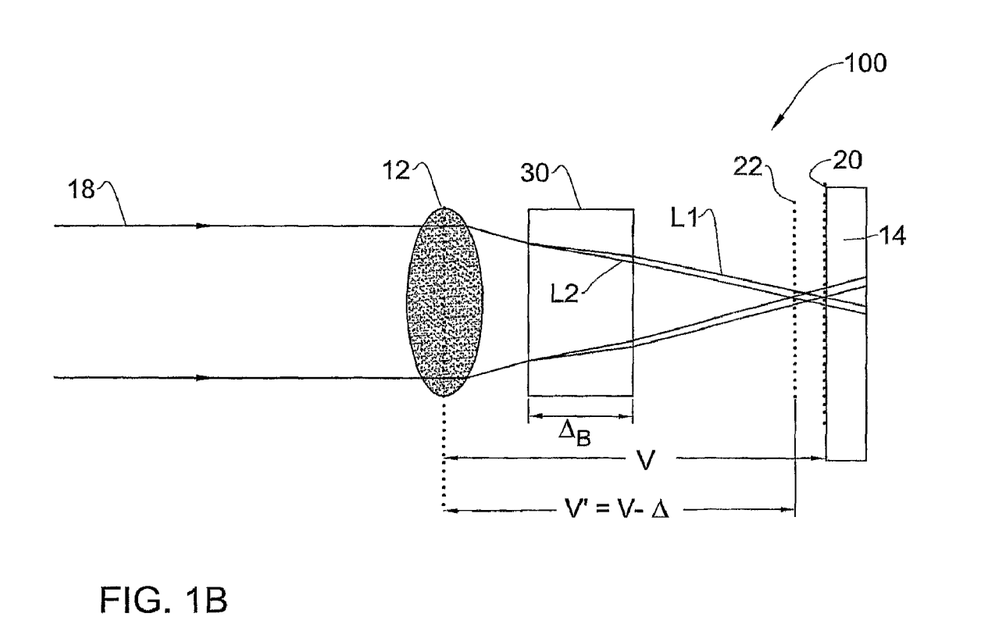
FIG. 1B shows more specifically the light propagation scheme through the imaging system when imaging far-field objects.
Figure 1C:
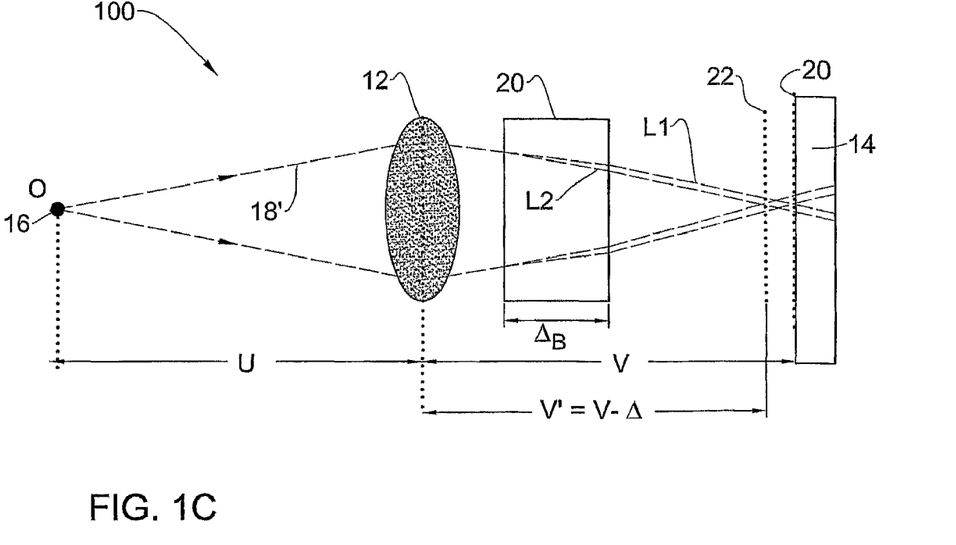
FIG. 1C shows the same for the near-field imaging mode.

Reference is made to FIGS. 1A to 1C comparing the configuration and operation of a conventional imaging system (FIG. 1A) and an imaging system of the present invention (FIGS. 1B and 1C). To facilitate understanding, the same reference numbers are for identifying common components in the different imaging systems.

As shown in FIG. 1A, the conventional imaging system, generally designated 10, includes an imaging (focusing) lens 12 and an imaging detector 14. Here, u (15 cm) is the distance between an object 16 to be imaged and the imaging lens 12, v is the distance between the lens 12 and a sensing surface of the detector 14, and f (5 mm) is the focal length of the lens 12. In such imaging system, typically u>>v≈f. Thus, since the imaging condition is:

$$\frac{1}{u} + \frac{1}{v} = \frac{1}{f} \quad (1)$$

when a large change in u occurs, a very small change in v is required in order to re-focus the image.

In addition, the conventional imaging system can be adjusted to have good imaging quality, starting from a certain minimal distance $u_{min}^{(FF)}$ to infinity (termed far field (FF) imaging). Considering imaging of an object (not shown) located in the far field, substantially parallel rays 18 (from infinity) are focused by the lens 12 on its focal plane 20, in which the detector 14 is located. On the other hand, the detector 14 can be shifted a bit, a distance Δ, and then the focusing can be obtained for the object 16 positioned in the near field (NF) at the distance u, being in the range $u_{min}^{(NF)} < u < u_{max}^{(NF)}$, satisfying the imaging condition for the given focal plane of the lens and the new (shifted) distance between the lens and the detector. As shown in the figure, rays 18' from the object 16 pass through the lens 12 and form an in-focus image of said object in an appropriate imaging plane 22, where now the detector is located.

If two proper positions 20 and 22 for the detector 14 are selected (i.e. a proper shift Δ is selected), then the two regions (far and near-field regions) can overlap, and a continuous range for in-focus positions of the image is obtained starting from a distance of $u_{min}^{(NF)}$ and up to infinity. The inventors have found that the difference Δ in the positions of the detector required in order to overlap both ranges is very small and can be only a few tens of microns.

The present invention provides for obtaining a substantially coinciding imaging planes (practically, common imaging plane) for both near- and far-field located objects, thus eliminating a need for moving the detector plane when shifting in between near- and far-field operation modes. This is achieved by utilizing a birefringent plate placed in an optical path of light being focused by the lens onto an imaging plane. As a result, a continuous in-focus range is obtained from a distance of $u_{min}^{(NF)}$ and up to infinity.

The above is illustrated in FIGS. 1B and 1C, showing the configuration and operation of an imaging system 100 of the present invention.

The system 100 includes a lens unit 12 having a focal length f, an imaging detector 14, spaced from the lens unit a distance v, and also includes a birefringent unit 30. The unit 30 is designed like a plate and can be positioned anywhere between the detector 14 and the imaging lens unit 12. The birefringent plate 30 is configured such that a refraction index of this plate for a light component of one principle polarization state passes an effective optical path to the detector plane as if the detector is positioned in an imaging plane corresponding to the far-field imaging condition, and a refractive index for a light component of the other principle polarization state will pass through the effective optical path to the detector plane as if the detector is positioned as required for the near-field imaging condition. Such birefringent plate 30 can be very thin since a difference between the two positions, when free space is involved, is only a few tens of microns.

FIGS. 1B and 1C schematically illustrates the way in which the path of a light ray through the conventional imaging module (lens 12 and detector 14) is affected by the introduction of the non-lensing birefringent plate 30. The birefringent plate 30, as being not a lens, does not converge/diverge light beams passing therethrough. In order to simplify this diagram, separate figures are provided to demonstrate the far and near field imaging. FIG. 1B shows the propagation of light rays 18 from the far field region, arriving at and being focused by the lens 12, and FIG. 1C shows a light propagation scheme corresponding to the near-field region.

The birefringent plate 30 is located downstream of the lens 12 in the direction of light propagation, thus being in the path of light focused by the lens 12. As indicated above, the refraction indices of the birefringent plate for ordinary and extraordinary light components are appropriately different. The plate thus splits unpolarized light incident thereon into spatially separated polarization components $L_1$ and $L_2$ As can be seen in FIGS. 1B and 1C, the two paths form an in-focus image of the far-field object (FIG. 1B) and that of the near-field object 16 (FIG. 1C) at different imaging planes 20 and 22. It should be noted that it is possible to align the system such that v≈v' thereby bringing the proximal imaging plane 20 for the far field close to or coincident with the imaging plane 22.

Thus, the near- and far-field ranges overlap. Accordingly, both images (each arriving in different polarization state) will be superimposed one on top of the other. Since the near-field image is in its in-focus state for near-field ranges and is very defocused for far-field ranged, and the far-field image behave vice versa, the superimposed result will be in-focus for both ranges (i.e. will have extended depth of focus by combining both ranges), and the contrast can be reasonably high (above 40%), even when no digital processing is applied.

It should also be noted although not specifically shown that the birefringent element 30 could be configured with a not uniform shape, thus providing for coding multiple coding planes. For example, the birefringent element may have a space varying width, in which case different spatial positions of the birefringent element will provide focus for two axially different planes and thus multiple axial planes will be in focus. This can be implemented by configuring the birefringent element as a check board with different width of the squares of the check board. In this case, each square will provide focused imaging of two different axial planes.

The birefringent element may not be flat but having a curtain surface curvature. The use of such birefringent element provides for improving the depth of focus and to reduce aberrations of focusing.

Thus, the invented technique is very simple, versatile and cheap, and moreover it is also an all-optical concept. As for the birefringent element, it can be made of any suitable material in which birefringence was synthesized using spatial structure. An example for the birefringent material can be a Calcite or $YVO_4$ which are commercially available in the market and also have very strong birefringence, i.e. a large difference in the refraction indices between the two principle axes (the two states of polarization). Generally, the birefringent element can be made of any suitable known material, preferably highly transparent to visible light.

Figure 1D:
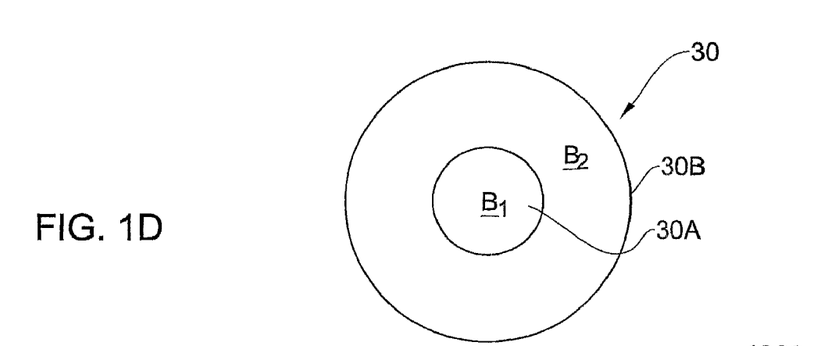
FIG. 1D exemplifies a birefringent element suitable to be used in the imaging system of the present invention, where the birefringent element is configured to correct aberrations caused by the imaging lens unit.

The imaging system of the present invention could be configured to correct aberrations. As the propagation of light components impinging on a birefringent element at different angles of incidence is differently affected by the birefringent element, the latter may be configured with different birefringence at its central and peripheral regions, thereby compensating for the aberrations. This is schematically illustrated in FIG. 1D. As shown, a birefringent element 30 is made of a hybrid material having first birefringence $B_1$ in its central region 30A and second different birefringence $B_2$ at its peripheral part 30B.

Figure 1E:
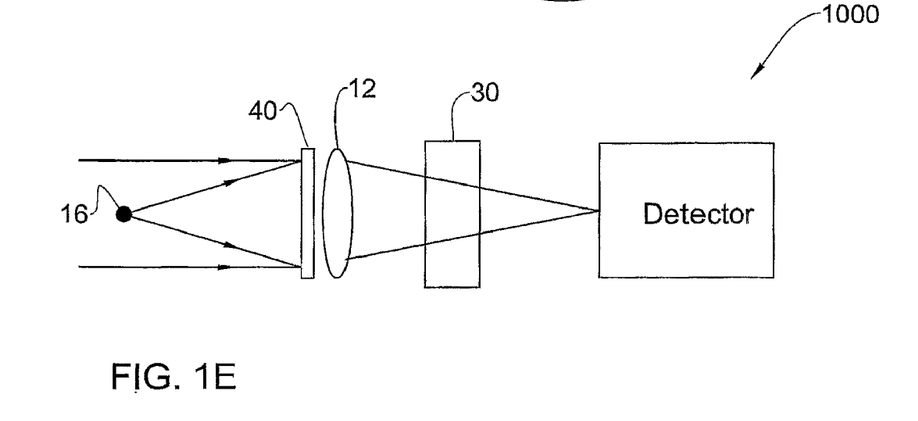
FIG. 1E exemplifies an imaging system of the present invention using a birefringent element and a phase-affecting optical element.

It should be noted that the invented technique can be combined together with other all-optical techniques for extending the depth of focus, as described for example in U.S. Pat. No. 7,061,693 assigned to the assignee of the present application, and that way to result with even larger range of in-focus imaging. This is illustrated in FIG. 1E showing an imaging system 1000 including an imaging lens unit 12, a phase-affecting optical element 40 located at the entrance pupil of the lens unit 12, a birefringent unit 30, and an imaging detector 14. The optical element 40 may be located close to, or attached to, or incorporated in the lens unit 12. This optical element 40 is configured as a phase-affecting, preferably non-diffractive, optical element defining a spatially low frequency phase transition. The optical element and the imaging lens define a predetermined pattern formed by spaced-apart substantially optically transparent features of different optical properties. Position of the phase transition region(s) of the optical element within the imaging lens plane is determined by at least a dimension of the affective aperture of the lens 12.

It should also be noted that the use of a combination of a birefringent element (of uniform or non-uniform shape as described above) and a phase-affecting optical element allows for effective imaging with reduced chromatic aberrations. The birefringent element may be configured not for increasing the depth of focus but for correcting the effect of different focusing lengths of the imaging lens for different wavelengths of light. In this case, a small extended depth of focus correction by the phase affecting element, all the wavelengths could be focused and the chromatic aberrations be corrected.

As indicated above, the insertion of the birefringent unit 30 between the imaging lens unit 12 and the detector 14 can significantly increase the obtained depth of focus. Such birefringent unit can be a plate of a small thickness $\Delta_B$ that does not influence or increase the initial size parameters of the imaging system 100. The required thickness for such a birefringent plate can be determined as follows:

Assuming that the difference in the optical paths in free space is $\Delta$ and the birefringent material has ordinary and extra-ordinary refraction indices $n_o$ and $n_e$ respectively, then the width of the birefringent plate should be:

$$\Delta_B = \frac{\Delta}{\left(1 - \frac{n_o}{n_e}\right)} \quad (2)$$

The following are some simulation results obtained using Zemax which is industrial software most commonly used for lens design and optical analysis. For the simulation, an imaging triplet with effective focal length of f=5 mm and F number of 2.8 was used. Using eq. 2 above, the required thickness of the birefringent plate is determined as follows: $YVO_4$ plate was used having approximately $n_o$=1.99 and $n_e$=1.22 for the visible range, and thus the optical path difference $\Delta$ of 130 microns results with the birefringent plate thickness:

$$\Delta_B = \frac{0.13}{\left(1 - \frac{1.99}{2.22}\right)} = 1.25 \text{ mm}$$

as the optical path difference of 130 micron is sufficient to obtain continuous and extended longitudinal range of in-focus positions of the imaging plane.

Thus, a birefringent plate of 1.25 mm thickness was inserted into the Zemax simulator. When the birefringent plate was added, the through focus Modulation Transfer Function (MTF) chart for the near-field region was obtained in one principle polarization state and the through focus MTF for the far-field region was obtained in the other polarization state, both superimposed in the detector plane.

Figure 2A:
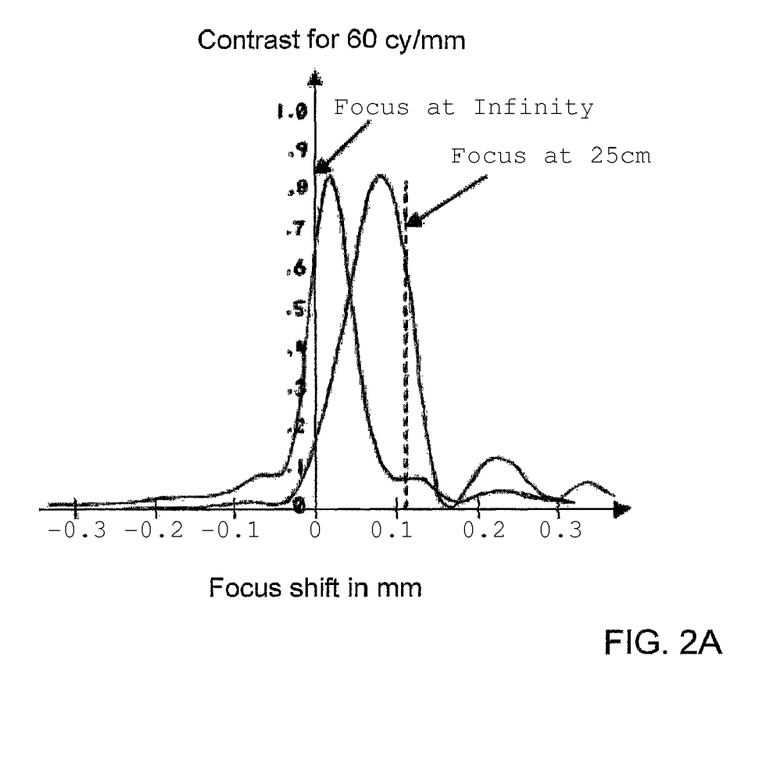
FIG. 2A shows the through focus MTF charts for ordinary and extraordinary polarization states obtained with the system of the present invention for object positioned at infinity and at 25 cm from the imaging lens unit.
Figure 2B:
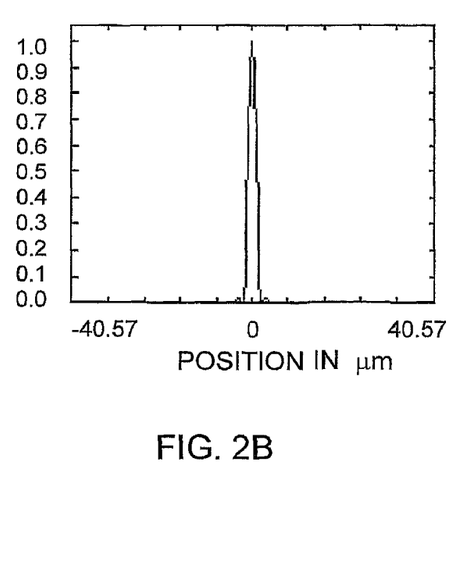
FIGS. 2B and 2C show the overall point spread function (for both polarizations) for the object at infinity (FIG. 2B) and at 25 cm from the lens (FIG. 2C)
Figure 2C:
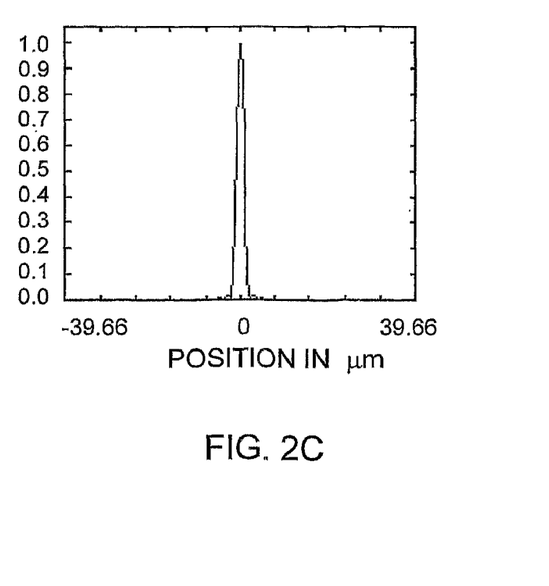

FIGS. 2A to 2C show the simulation results for the above, showing the regular through focus MTF chart, using Zemax with a birefringent element (plate) being defined as part of the optical configuration of the system.

FIG. 2A shows two graphs corresponding to the through focus MTF charts for ordinary and extraordinary polarization states, both at 60 cycles per mm (spatial frequency) for, respectively, different axial positions of the object: the object positioned at infinity and at 25 cm from the lens with the birefringent element added between the lens and the detector. The horizontal units are in mm (measured in the detector plane). The MTF graph for focus at infinity corresponds to p-polarization and the MTF graph for focus at 25 cm corresponds to the s-polarization state. Both curves are superimposed in the MTF chart. As can be seen, when the object moves from near to far field, the through focus MTF chart shifts. Since in the birefringent case the chart is twice as wide (because it is a summation of two shifted charts each corresponding to different polarization state), an increased depth of focus is obtained. The movement of the object from a position of 25 cm away from the detector (camera) towards the far field distances, is equivalent to movement of 0.13 mm in the detector plane maintaining high imaging contrast of above 0.7. Thus, contrasts of above 20% may be obtained even for object positioned at distance of 15 cm away from the imaging lens. If only one curve (rather than both) would have been used (i.e. without applying the birefringent element), then the movement of the object from 25 cm to infinity would have reduced contrast of the MTF to less than 0.1 (i.e. the spatial frequency of 60 cycles per mm would have become irresolvable).

To clarify the effect obtained with the present invention, the overall point spread function (for both polarizations) is illustrates in FIGS. 2B and 2C. Two graphs are shown, one for the object at infinity (FIG. 2B) and the other for the object at 25 cm from the lens (FIG. 2C). As can be seen in the figures, the quality of imaging at infinity as well as at 25 cm is very good since the overall point spread function has width of approximately one pixel of the detector (about 6 microns).

Figure 2D:
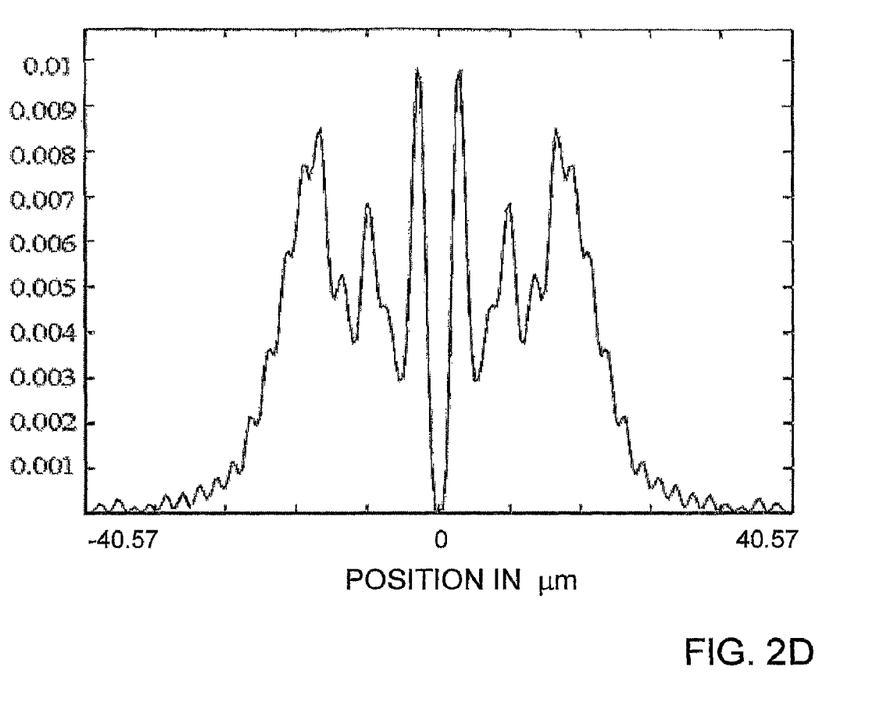
FIG. 2D shows the simulation results for the point spread function of one of the polarization states (e.g. ordinary polarization) when the other (extraordinary) is in focus.

FIG. 2D shows the point spread function of the ordinary polarization when the extraordinary is in focus or vice versa. It is seen that the defocused polarization can always be neglected since it contributes only very low frequency background.

Figure 3:
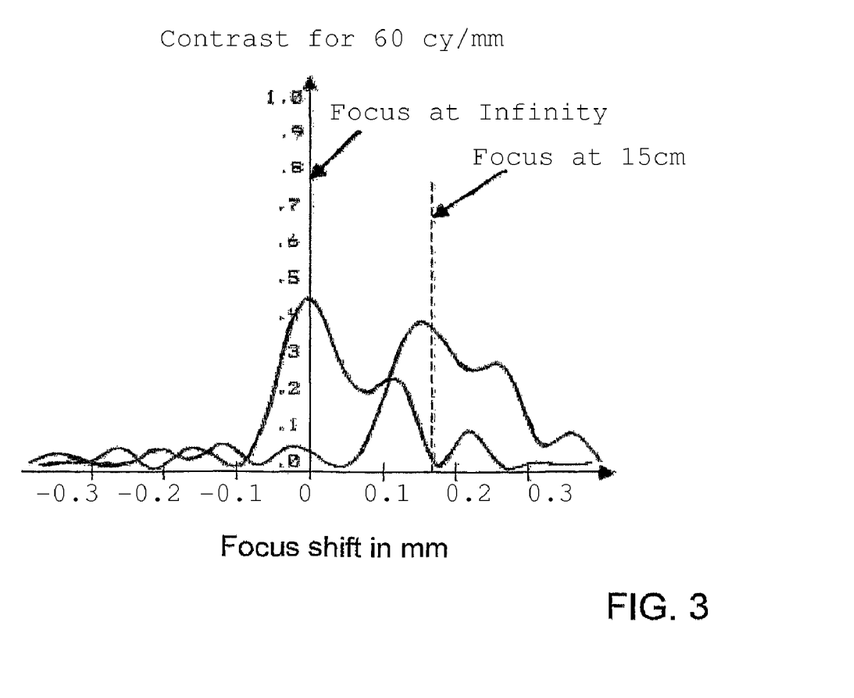
FIG. 3 illustrates the through focus MTF chart at 60 cycles per mm of the system of the present invention utilizing a phase-affecting element and a birefringent element, in association with the imaging lens unit in the system of the present invention, where the low spatial frequency phase element is positioned at the entrance pupil of the lens and the birefringent plate is positioned between the lens and the detector, for two cases of, respectively, the object at infinity and at 15 cm from the lens.

In order to extend even further the obtained overall extended depth of focus (EDOF), the inventors have added a binary and low spatial frequency phase element as described above and in the above mentioned U.S. Pat. No. 7,061,693, which is incorporated herein by reference with respect to this specific example. This element allows extending the depth of focus in an all-optical manner as well. The element was positioned at the entrance pupil of the imaging lens, and the same birefringent plate was placed in between the lens and the detector. The obtained results (using Zemax software) are presented in FIG. 3 showing two graphs, corresponding to through focus MTF chart at 60 cycles per mm for, respectively, object at infinity and at 15 cm from the lens, both for the case with the birefringent plate between the lens and the detector the low spatial frequency phase element at the entrance pupil of the lens. As can be seen in the figure, although the contrast is reduced (to 0.4) much larger depth of focus can be obtained and the object even at distance of 15 cm may well be resolved (with contrast of above 0.4 at spatial frequency of 60 cycles per mm). In this specific example, the phase transitions pattern in the phase element was in the form of an annular like structure with external diameter of about 2.6 mm for the ring and with etching depth of 350 nm.

The following are some examples illustrating the effect of the technique of the present invention on real images.

Figure 4A:
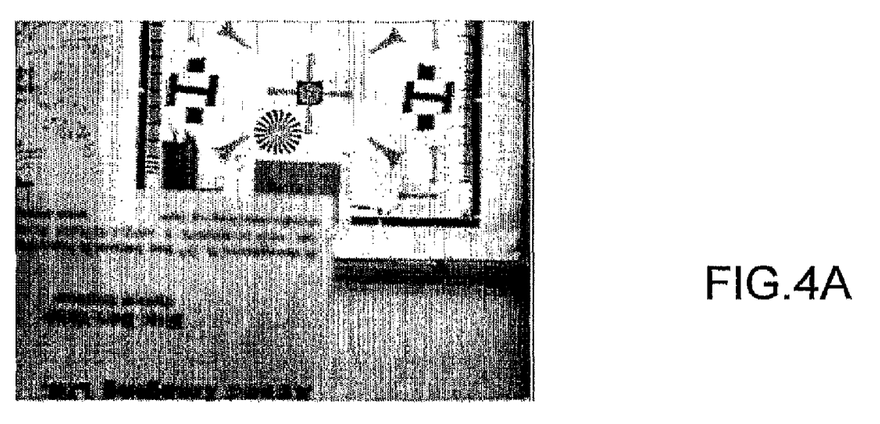
FIGS. 4A and 4B present images obtained when the detector is positioned such that, respectively, the far-field and the near-field objects are in-focus, and FIG. 4C presets the all-optical result obtained when a birefringent plate is used.
Figure 4B:
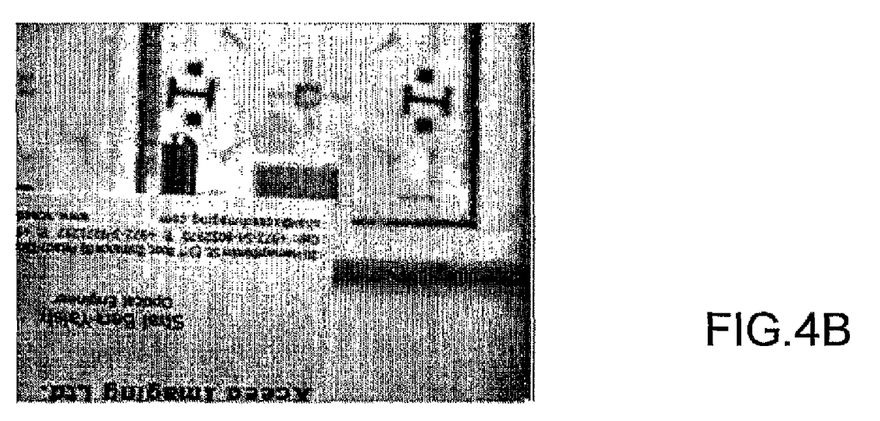
Figure 4C:
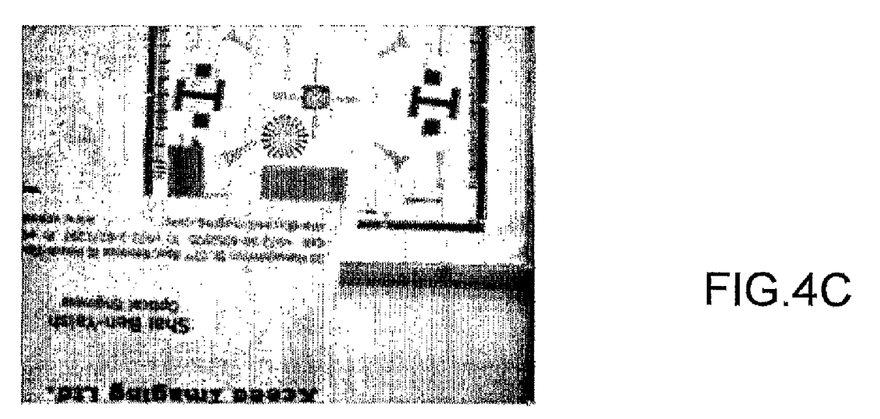

FIGS. 4A-4C show numerical testing applied on real images, obtained by combined usage of Zemax as well as Matlab softwares. FIGS. 4A and 4B present images obtained when the detector is positioned such that, respectively, the far-field and the near-field objects are in-focus. In the present example, the near-field object was a business card positioned 10 cm away from the camera (which contained the imaging lens in front of the sensing surface). FIG. 4C presets the all-optical result obtained when a birefringent plate of a 1.25 mm thickness is inserted into the imaging module (camera) of 2M pixels having focal length of 5 mm and F number of 2.8. As can be seen, both the near-field and the far-field objects are well resolved. It should be noted that the images of FIGS. 4A and 4B were obtained by experimentally capturing two images while shifting the detector. The shift of the detector between the two images was computed following the shift obtained in the through focus MTF charts of the Zemax when a birefringent plate of 1.25 mm is added to the system. The image of FIG. 4C is obtained by superimposing the two images of FIGS. 4A and 4B, as anticipated from the numerical Zemax simulation for the through focus MTF charts.

It should also be noted that the superimposing assumption of the MTF coming from both polarizations (p- and s-polarization states) was verified numerically using the Zemax simulations. In addition since the polarizations are orthogonal they are summed as intensities, rather than as fields, on the detector (after the time averaging operation during the detection) and therefore this implied that the OTF (optical transfer function) of each polarization state (rather than the coherent transfer function for instance) may be summed. As can be seen in FIG. 2D, the digital superimposing of both images as was done in FIG. 4C is relatively good assumption since the point spread function of the defocused polarization always contributes only very low frequency background level.

Figure 5A:
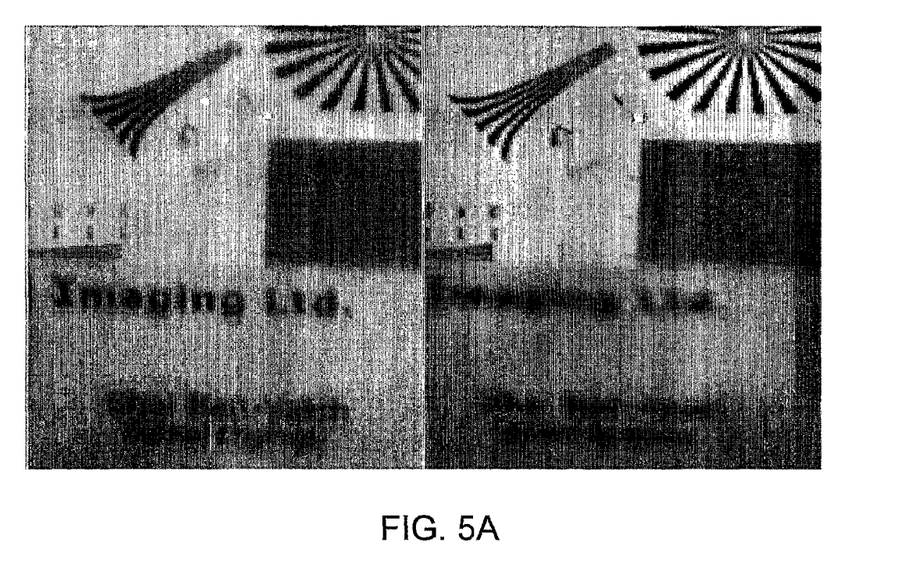
FIGS. 5A and 5B show further experimental results, presenting two different examples, each corresponding to imaging of both the near-field and the far-field objects, while, for comparison, the left side of each figure shows the image obtained with the birefringent element and the right side shows the images obtained with no birefringent element.
Figure 5B:
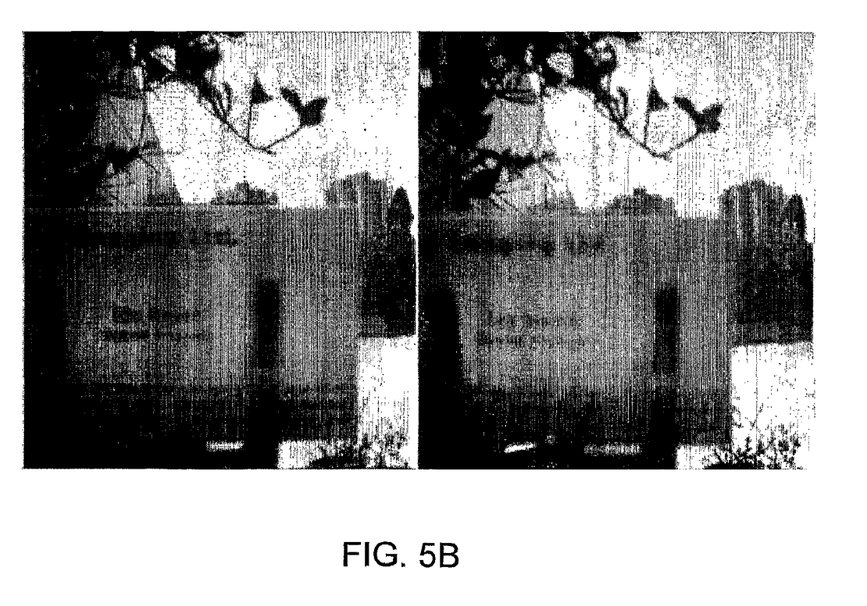

Further experimental results are shown in FIGS. 5A and 5B. In these experiments, a real imaging module was used, this was a videology camera having VGA resolution of 640 by 480 pixels with an imaging lens of focal length of 8 mm and an F number of 2.5. FIGS. 5A and 5B show two different examples, each presenting imaging of both the near-field and the far-field objects, while, for comparison, the left side of each figure shows the image obtained with the birefringent element of a 1.25 mm thickness inserted in the imaging module and the right side shows the images obtained with no birefringent element. The near-field object of FIG. 5A (business card) was at distance of 15 cm while the far-field resolution chart was at distance of 120 cm. In the experiment of FIG. 5B, the near-field object was at distance of 25 cm. The experiment of FIG. 5A was carried out in close doors, while that of FIG. 5B was captured outside. It can be seen that the improvement in the quality of focus in the images in the left side (with the birefringent element) provided better focusing of the near-field range objects while maintaining similar imaging quality for the far-field range objects (e.g. this is expressed in the capability to read the letters in the business card when the birefringent element is added in).

Figure 6:
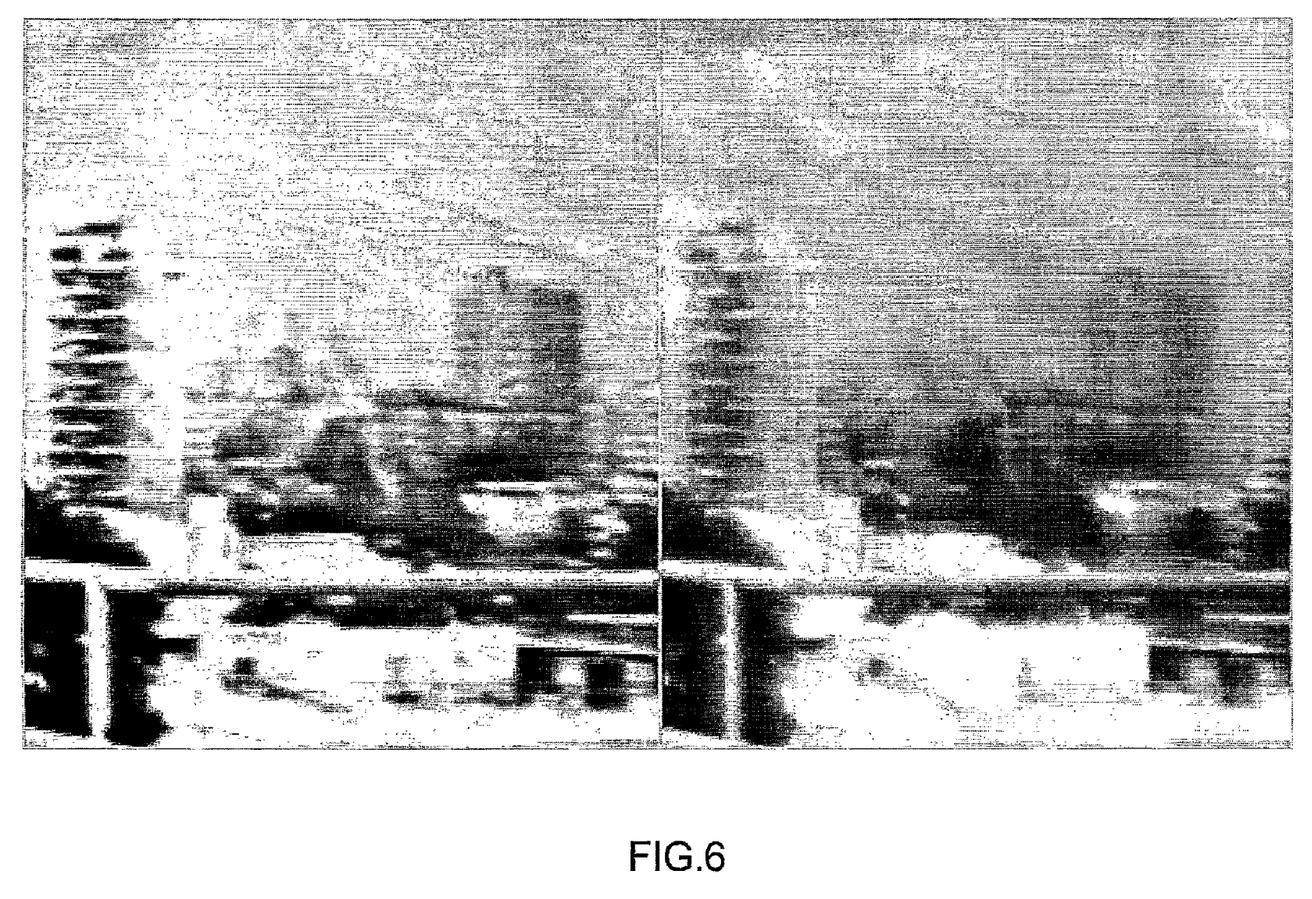
FIG. 6 illustrates how the use of a simple Wiener deblurring filter can further improve the image quality.

For wide fields of view of the imaging system, the rays coming at large angles generally pass in different direction through the birefringent element and therefore might obtain different depth of focus correction. Also, a double image effect might occur depending on the direction of arrival of the optical rays. In order to correct this effect, the inventors have applied a simple Wiener deblurring filter. The processing was intended to demonstrate that such distortion, if any, can easily be reduced. The obtained results are shown in FIG. 6. The left part of the figure corresponds to the case where the deblurring processing was applied, while for comparison purposes, the right part image corresponds to the case without any processing. It can be seen that the double image effects around bars (seen as white shadow) were significantly reduced in the left part image.

Thus, the present invention provides a simple and inexpensive solution for the imaging system effective operation in the near- and far-field ranges, without a need for any physical displacement of optical elements. This is achieved by using a birefringent plate (e.g. made out of calcite or $YVO_4$) inserted between the imaging lens and the detector, thus allowing extensive increase in the depth of focus. This technique was demonstrated for longitudinal continuous extended depth of focus that significantly reduces the minimal focusing distance of an imaging system. Such a configuration allows simultaneous imaging of close range business cards as well as having high quality imaging for the far field objects as required in high quality photography. The invented technique is basically an all-optical one and does not require computational load for the processing unit of the camera module, although numerical deblurring algorithms may assist in reducing various artifacts generated in the captured images.

While this invention has been particularly shown and described with references to preferred embodiments thereof, it will be understood by those skilled in the art that various changes in form and details may be made therein without departing from the scope of the invention encompassed by the appended claims.

The invention claimed is:

1. An imaging system comprising: an imaging lens unit, an imaging detector, and a birefringent element located between said imaging lens unit and said imaging detector, the system thereby providing in-focus imaging of objects located at both near-field and far-field ranges, the birefringent element having one of the following configurations:

the birefringent element is made of a material in which birefringency was synthesized using spatial structure;

the birefringent element is made of calcite or $YVO_4$;

the birefringent element has a space varying width;

the birefringent element is configured as a check board with different width of squares of the check board;

the birefringent element has a curtain surface curvature, thus improving the depth of focus and reducing aberrations of focusing;

the birefringent element is configured for correct aberrations created by the imaging lens unit; and birefringent element is configured and operable to provide time modulated birefringency thereof, the system being thereby configured an operable as an auto-focusing system having no moving parts.

2. The system according to claim 1, configured for providing the in-focus imaging of objects located from a distance of a few centimeters up to infinity from the imaging lens.

3. The system according to claim 2 wherein the near-field range is of below 20 cm from the imaging lens unit.

4. The system according to claim 1, wherein the far-field range is of from 50 cm to infinity from the imaging lens unit.

5. The system according to claim 1, wherein said birefringent element is configured as a plate of a predetermined thickness.

6. The system according to claim 5, wherein the thickness $\Delta_B$ of said birefringent plate is given by $$\Delta_B = \frac{\Delta}{\left(1 - \frac{n_o}{n_e}\right)}$$

where $\Delta$ is a difference between the far-field and near-field optical paths in free space for light passing through said imaging lens unit and $n_o$ and $n_e$ are refractive indices of the birefringent plate material for respectively ordinary and extra-ordinary polarization light components.

7. The system according to claim 6, wherein the thickness of the birefringent plate is between about 0.5 mm and about 2.5 mm.

8. The system according to claim 1, wherein said imaging lens unit has a focal length of about 5 mm and an F-number of about 2.8.

9. The system according to claim 1, comprising a phase-affecting optical element located at an entrance pupil of said imaging lens unit.

10. The system according to claim 9, wherein said phase-affecting optical element has a pattern of phase transitions.

11. The system according to claim 10, wherein said pattern of phase transitions has a spatially low frequency, the phase-affecting optical element being thereby substantially non-diffractive.

12. The system according to claim 10, wherein the birefringent element is configured for correcting chromatic aberrations of the imaging lens unit, and the phase-affecting optical element is configured for providing the extended depth of focus of imaging.

13. The system according to claim 1, wherein the birefringent element has different birefringence in its central and peripheral regions, thus correcting aberrations created by the imaging lens unit.

14. The system according to claim 1, configured for use in a photographic camera.

15. The system according to claim 14, adapted to be used in a mobile phone or PDA.

16. The system according to claim 1 configured for use with an ophthalmic lens, the birefringent element being an intraocular element for positioning between the retina and the lens of the eye.

17. An optical device for use in the system of claim 1, the optical device comprising a birefringent element configured to be located between the imaging lens unit and the light sensitive element, the optical device being configured for providing extended depth of focus of imaging to provide in-focus imaging of objects located at both near-field and far-field ranges.

18. An optical device for use is an imaging system having an imaging lens and a light sensitive element, the optical device comprising a birefringent element configured to be located between said imaging lens unit and said light sensitive element, and a phase-affecting optical element located at an entrance pupil of said imaging lens, the optical device being configured for providing extended depth of focus of imaging to provide in-focus imaging of objects located at both near-field and far-field ranges.

19. The optical device according to claim 18, wherein the birefringent element is configured for correcting chromatic aberrations of the imaging lens, and the phase-affecting optical element is configured for providing the extended depth of focus of imaging.

20. An imaging system comprising:
an imaging lens unit,
an imaging detector, and
a birefringent element located between said imaging lens unit and said imaging detector,
the system thereby providing in-focus imaging of objects located at both near-field and far-field ranges,
said birefringent element being configured as a plate of a predetermined thickness $\Delta_B$ given by $$\Delta_B = \frac{\Delta}{\left(1 - \frac{n_o}{n_e}\right)}$$

where $\Delta$ is a difference between the far-field and near-field optical paths in free space for light passing through said imaging lens unit and $n_o$ and $n_e$ are refractive indices of the birefringent plate material for respectively ordinary and extra-ordinary polarization light components.

21. The system according to claim 20, wherein the birefringent element has one of the following configurations:

the birefringent element is made of a material in which birefringency was synthesized using spatial structure;

the birefringent element is made of calcite or $YVO_4$;

the birefringent element has a space varying width;

the birefringent element is configured as a check board with different width of squares of the check board;

the birefringent element has a curtain surface curvature, thus improving the depth of focus and reducing aberrations of focusing;

the birefringent element is configured for correct aberrations created by the imaging lens unit; and birefringent element is configured and operable to provide time modulated birefringency thereof, the system being thereby configured an operable as an auto-focusing system having no moving parts.

22. An imaging system comprising:
an imaging lens unit,
an imaging detector, and
a birefringent element located between said imaging lens unit and said imaging detector,
the system thereby providing in-focus imaging of objects located at both near-field and far-field ranges,
said imaging lens unit having a focal length of about 5 mm and an F-number of about 2.8.

23. An imaging system comprising:
an imaging lens unit,
an imaging detector,
a birefringent element located between said imaging lens unit and said imaging detector, and
a phase-affecting optical element located at an entrance pupil of said imaging lens unit,
the system providing in-focus imaging of objects located at both near-field and far-field ranges.

24. The system according to claim 23, wherein said phase-affecting optical element has a pattern of phase transitions.

25. The system according to claim 24, wherein said pattern of phase transitions has a spatially low frequency, the phase-affecting optical element being thereby substantially non-diffractive.

26. The system according to claim 24, wherein the birefringent element is configured for correcting chromatic aberrations of the imaging lens unit, and the phase-affecting optical element is configured for providing the extended depth of focus of imaging.

27. An imaging system comprising:
an imaging lens unit,
an imaging detector, and
a birefringent element located between said imaging lens unit and said imaging detector,
the system thereby providing in-focus imaging of objects located at both near-field and far-field ranges,
the birefringent element having different birefringence in its central and peripheral regions, thus correcting aberrations created by the imaging lens unit.

28. An imaging system configured for use with an ophthalmic imaging lens of the eye and comprising
an imaging lens unit,
an imaging detector, and
a birefringent element located between said imaging lens unit and said imaging detector, the system thereby providing in-focus imaging of objects located at both near-field and far-field ranges,
configured for use with an ophthalmic lens, the birefringent element being an intraocular element for positioning between the retina and the lens of the eye.

* * * * *